United States Patent [19]

Fink et al.

[11] 4,149,708
[45] Apr. 17, 1979

[54] CLAMPING ARRANGEMENT FOR SUPPORTING RAW CASTINGS DURING PROCESSING

[75] Inventors: Lothar Fink, Jestetten, Fed. Rep. of Germany; Rudolf Pavlovsky, Schaffhausen, Switzerland

[73] Assignee: George Fischer Limited, Switzerland

[21] Appl. No.: 870,489

[22] Filed: Jan. 18, 1978

[30] Foreign Application Priority Data

Jan. 20, 1977 [CH] Switzerland .................. 675/77

[51] Int. Cl.² ............................................. B23Q 1/04
[52] U.S. Cl. .................................................... 269/69
[58] Field of Search .................. 269/55, 63, 69, 71, 269/238, 309

[56] References Cited

U.S. PATENT DOCUMENTS

| | | | |
|---|---|---|---|
| 863,340 | 8/1907 | Wright | 269/69 |
| 3,537,701 | 11/1970 | Claycomb | 269/309 |
| 3,700,228 | 10/1972 | Peale | 269/71 X |
| 3,902,727 | 9/1975 | Banyas et al. | 269/238 X |
| 4,114,281 | 9/1978 | Pavlovsky et al. | 269/71 X |

Primary Examiner—Robert C. Watson
Attorney, Agent, or Firm—Roylance, Abrams, Berdo & Farley

[57] ABSTRACT

A clamping arrangement to firmly clamp workpieces of variable shape to permit the workpieces to be processed on all peripheral sides includes a rotating platform and a clamping lever. The platform and the lever are separately mounted on the housing of the clamping arrangement. The lever is mounted on the housing by means of a column and a bearing part. The column is fixedly secured to the housing. The bearing part is rotatably and adjustably connected to the column to permit the bearing part to be located at various positions along the length of the column. The clamping lever is pivotably coupled to the bearing part and may be driven by fluid pressure operated cylinders between clamping and releasing positions. The clamping lever has two telescoping parts to permit the portion of the clamping lever which engages the workpiece to be radially adjustable with respect to the column. When the clamping lever is actuated, the workpiece is secured between a conical clamping peg at the free end of the clamping lever and supports on the rotating platform.

15 Claims, 8 Drawing Figures

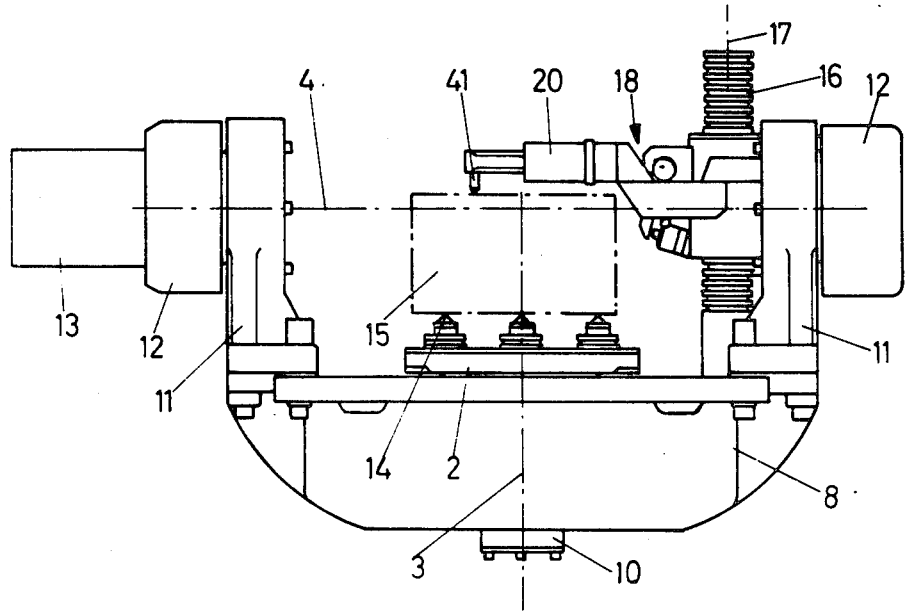

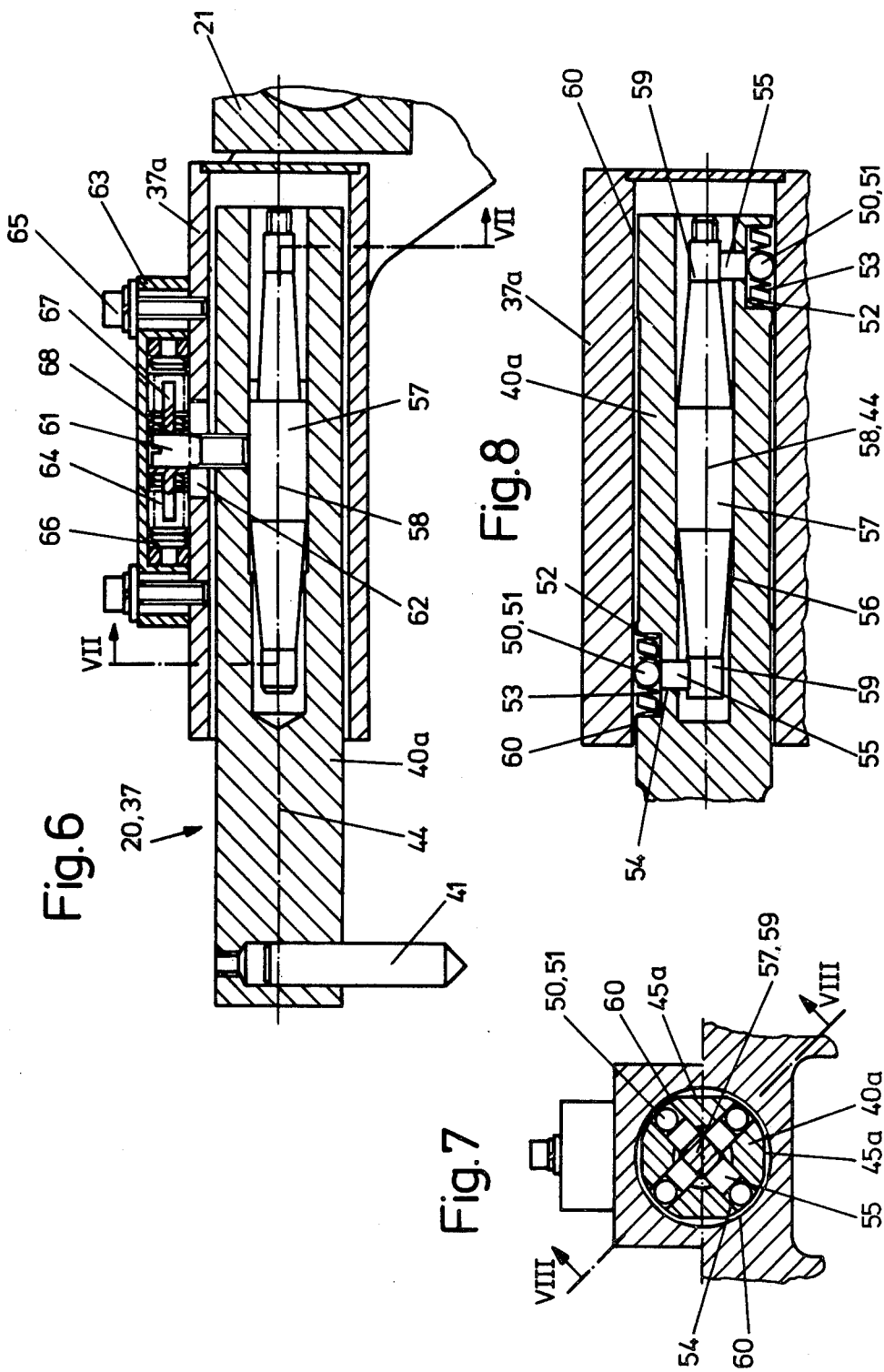

CLAMPING ARRANGEMENT FOR SUPPORTING RAW CASTINGS DURING PROCESSING

This invention relates to a device for clamping workpieces of variable shape so that the workpieces may be operated on different sides thereof without the workpiece being completely removed from the device.

BACKGROUND OF THE INVENTION

Known and conventional means for clamping workpieces for multilateral processing have involved the mounting of workpieces on the periphery of rotary work tables by means of clamping levers supported and attached to the rotary tables. The disadvantage in these devices is that no processing is possible or is greatly restricted on the side of the workpiece where the attachment or support of the clamping lever is located.

Other known clamping arrangements involve the use of magnetic work tables. Although magnetic work tables obviate the disadvantage noted above, they are only suitable for workpieces having flat gripping surfaces and may only be used when relatively small cutting forces are incurred in the processing of the raw casting.

BRIEF DESCRIPTION OF THE INVENTION

It is the object of this invention to provide an arrangement for clamping workpieces in such a manner that the workpieces may be processed by a tool on all sides of the workpiece's periphery without interfering with the movement of the tool and without removing the workpieces from the clamping arrangements, and capable of maintaining a firm gripping action to resist high cutting forces.

Another object of the present invention is to provide a clamping arrangement which may be easily and quickly adjusted to grip workpieces of varying shapes.

Other objects, advantages and salient features of the present invention will become apparent from the following detailed description of two preferred embodiments of the present invention.

Briefly described, the invention includes a clamping arrangement for supporting raw castings or other workpieces during processing comprising housing means adapted to be connected to a frame, a platform rotatably mounted on the housing means about a first vertical axis, a column secured to the housing means adjacent to, but outside, the periphery of the platform, the column extending along a second vertical axis, supporting means rotatably mounted on the column about the second vertical axis, and a clamping lever pivotably coupled to the supporting means to permit the lever to move toward the platform to clamp a workpiece therebetween and away from the platform to release a workpiece, the lever including a guiding means and a telescoping arm slidably mounted in the guiding means to permit the telescoping arm to move along a telescoping axis which is disposed radially with respect to the second vertical axis, the telescoping arm having means mounted thereon for engaging the workpiece.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of the specification, and wherein:

FIG. 5 is a cross-sectional view of the clamping arrangement taken along lines V—V of FIG. 3;

FIG. 6 is an enlarged side cross-sectional view of an alternative embodiment of the clamping lever shown in FIG. 3;

FIG. 7 shows a cross-sectional view of the alternative embodiment taken along lines VII—VII of FIG. 6; and FIG. 8 shows a cross-sectional view of the alternative embodiment of the gripping lever taken along lines VIII—VIII of FIG. 7.

DETAILED DESCRIPTION OF THE INVENTION

Figure 1:
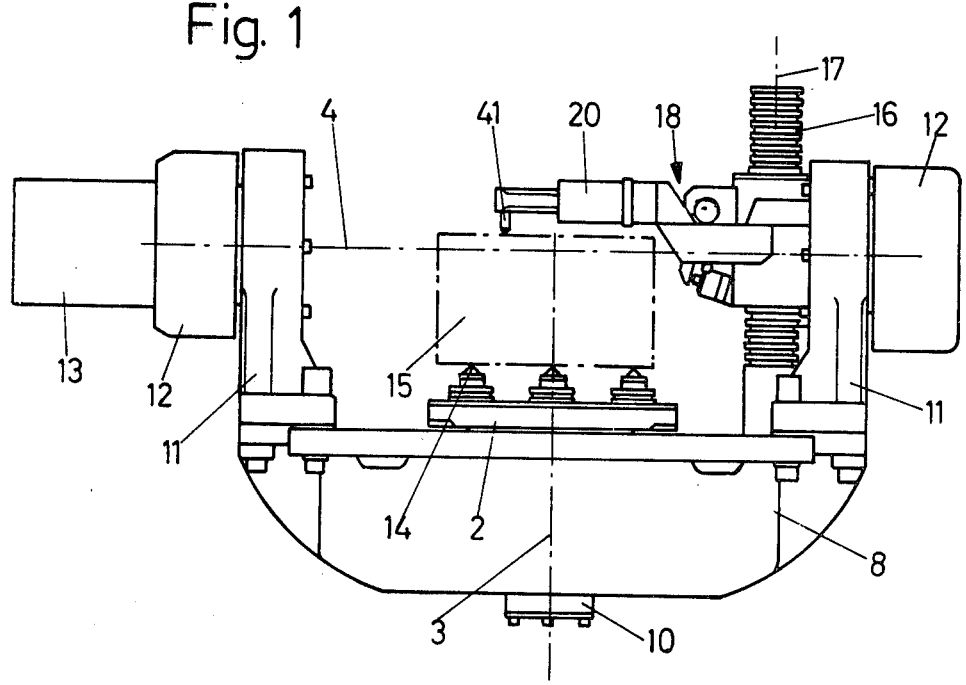
FIG. 1 is a side view of a clamping arrangement in accordance with the present invention.
Figure 2:
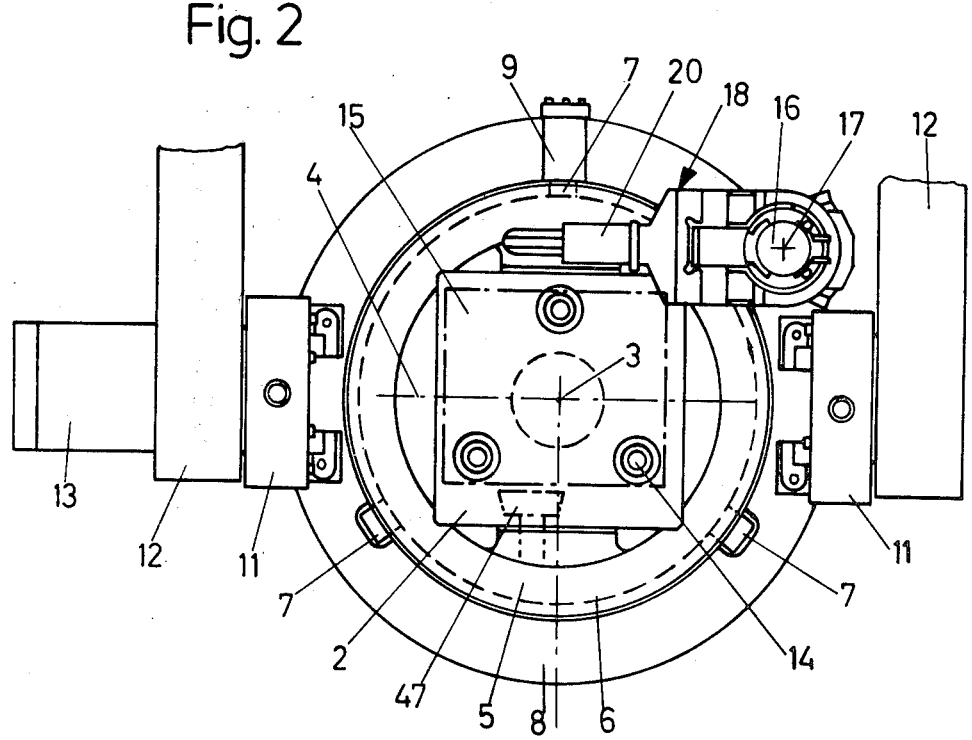
FIG. 2 is a top view of the clamping arrangement of FIG. 1.

Referring to FIGS. 1 and 2, the clamping arrangement comprises a frame and housing 8, a platform 2 rotatably mounted on the housing 8 about a vertical axis 3, a column 16 secured to the housing 8 adjacent to, but outside, the periphery of the rotatable platform 2, and a clamping device 18 connected to the column 16. A workpiece 15 is clamped between the clamping device 18 and the platform 2.

The platform 2 is attached to a rotary body 5. The body 5 is rotatably mounted to the housing 8 by means of sliding pieces 7 and peripheral groove 6. The peripheral groove 6 is formed in the rotary body 5. The sliding pieces 7 extend inwardly from the housing 8 and into the groove 6 of body 5 to provide a three-point bearing to support the body 5. One of the sliding pieces 7, as shown in FIG. 2, is connected to a hydraulic cylinder 9 which enables that sliding piece to be moved radially within the groove 6. When that sliding piece is in its retracted position, the rotary body 5 is able to rotate relative to the housing 8. When fluid pressure is applied to the hydraulic cylinder 9 and the sliding piece connected to the hydraulic cylinder 9 is forced radially inwardly to engage forcibly the sides of groove 6, the rotary body 5 will be clamped firmly in a fixed position relative to the housing 8. The rotating of the platform 2 is accomplished by means of a hydraulic motor 10 which is attached to the housing 8.

Two arms 11 are fixedly attached to the housing 8 and extend upwardly therefrom. The ends of the arms 11 remote from the housing 8 are mounted rotatably in the bearings of two holding arms 12. The arms 11 may be rotated in the bearings about the horizontal axis 4 by a hydraulic motor 13. This arrangement permits the entire clamping structure on the housing to be rotated about the horizontal axis 4. The two holding arms 12 may be attached to a supporting frame (not shown).

Supports 14 are mounted on the platform 2 and are so located thereon so as to correspond with the pertinent support places of the workpiece 15. The pointed shape of the supports 14 ensures a secure engagement between the platform 2 and the workpiece 15.

Column 16 is attached to the housing so that it is adjacent to, but outside of, the periphery of the platform 2. Column 16 extends along a vertical axis 17 which is parallel to the axis 3 about which the platform rotates. Screws 19 secure the column 16 to the housing 8.

The clamping device 18 comprises a clamping lever 20 which is connected to the column 16 by a bearing part 21. The bearing part 21 is connected to the column 16 so that it may rotate about axis 17 and be selectively positioned at various locations along the length of the column 16. A holding mechanism 24 provided on the bearing part 21 secures the bearing part 21 to the column 16. Column 16 is formed with a plurality of annular grooves 25 disposed in parallel relationship to one another along the length of column 16. The holding mechanism 24 includes two sheet metal holder members 26 pivotably attached to the upper front side of the bearing part 21 by screws 27. Projections 28 formed on the inside edges of the holder members 26 are adapted to selectively engage any one of the annular grooves 25. A tension spring 29 is connected to adjacent ends of the holder members 26 to bias the projections toward each other into a groove-engaging position. Handle members 30 are attached to the holder members 26 on the ends thereof remote from the spring 29. The handle members 30 enable the holder members 26 to be pivoted about the screws 27 and against the bias of spring 29 to cause the projections to be removed from an annular groove 25 to permit the bearing part to be moved axially along the vertical length of column 16. When the bearing part is located on column 16 in its desired position, the handle members 30 are released so that the spring 29 forces the projections 28 into the annular groove 25 to hold the bearing part in position. In this manner, the height of the clamping device 18 above the platform 2 may be adjusted.

Figure 3:
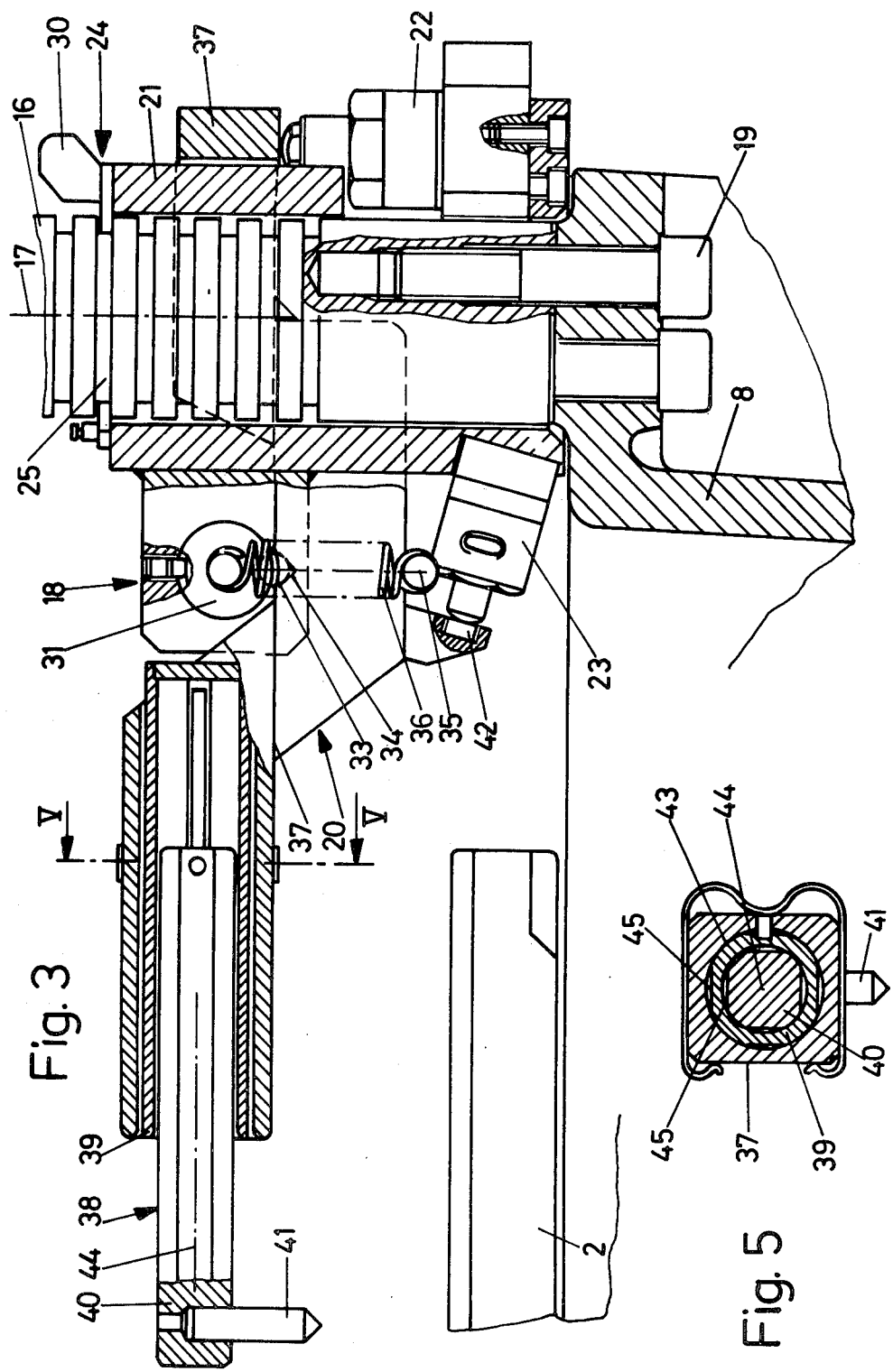
FIG. 3 is an enlarged sectional side view of a portion of the clamping arrangement of FIG. 1.
Figure 4:
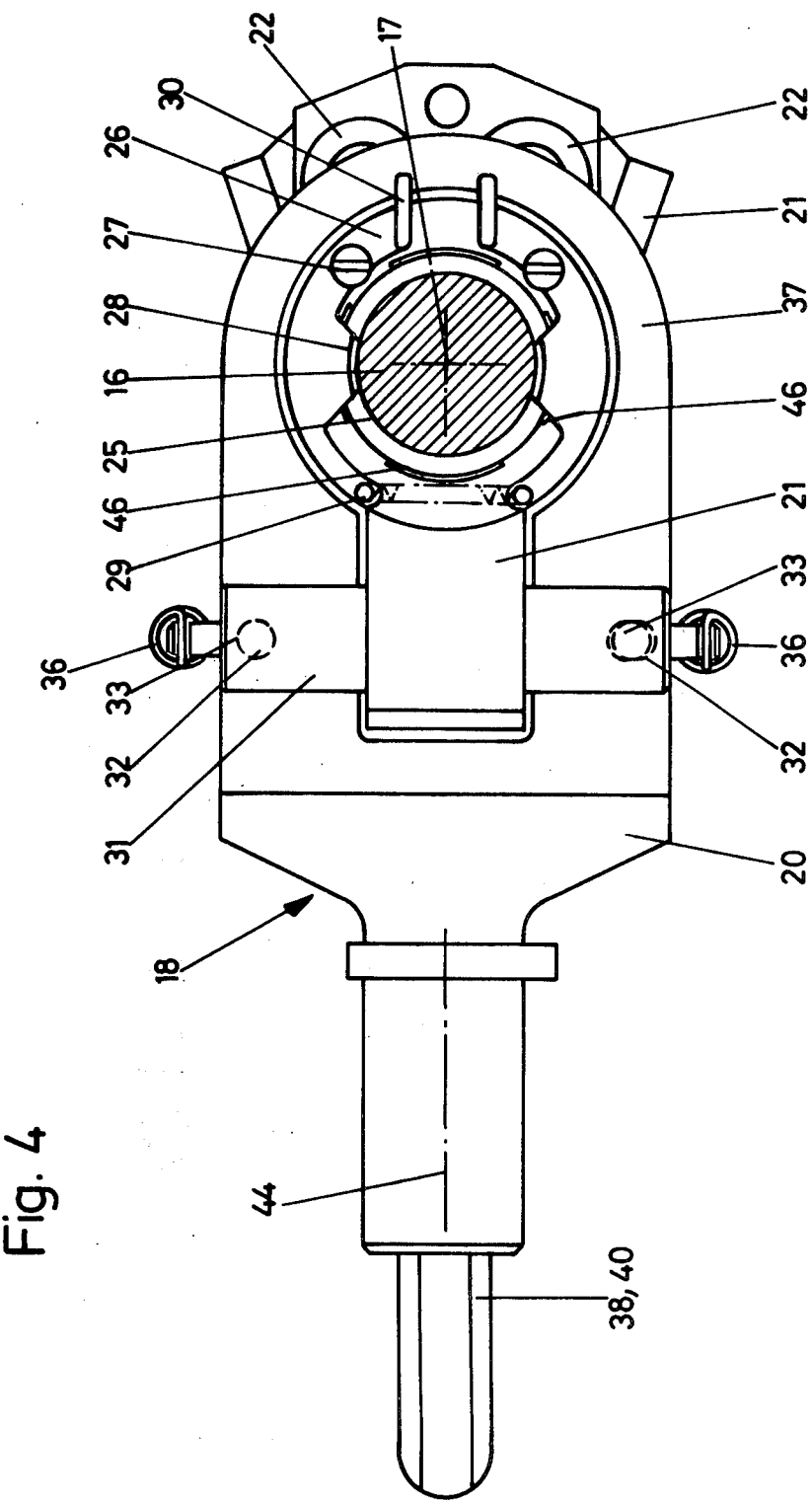
FIG. 4 is a top view of FIG. 3.

The clamping lever 20 is pivotably coupled to the bearing part 21. A bolt 31 is provided on the bearing part 21, as clearly shown in FIGS. 3 and 4. Adjacent each end of the bolt 31, a depression 32 is provided on a lower peripheral area of the bolt 31. A ball bearing 33 is located in each of the depressions 32. The balls 33 provide the bearing surface about which the clamping lever 20 pivots. The clamping lever 20 is provided with depressions 34 so that it may also receive the ball bearings 33. The bearing part and the clamping lever 20 are flexibly connected by tension springs 26. The tension springs 36 are suspended between the bolt 31 on the bearing part 21 and the bolt 35 on the clamping lever 20.

Two clamping cylinders 22 are mounted on the bearing part to actuate the clamping lever 20. The clamping lever 20 has a guide part 37 which extends about the bearing part 21. Portions of the clamping cylinders 22 are operably coupled to the guide part 37 to cause the clamping lever 20 to pivot in a clamping direction. On the side of the bearing part, opposite to the side on which the clamping cylinders 22 are located, a clearing cylinder 23 is mounted. A projection 42 extends downwardly from the clamping lever 20 adjacent the clearing cylinder 23. Upon actuation of the clearing cylinder 23, a portion of the clearing cylinder 23 pushes against the projection 42 to pivot forcibly the clamping lever in a releasing direction. The clamping cylinders 22 and the clearing cylinder 23 may be operated at different pressure levels to develop different forces to be applied against the workpiece 15.

A portion of the guide part 37 of the clamping lever 20 comprises a rigid hollow member which extends radially with respect to the axis 17. A telescoping arm 38 is mounted in the hollow member so that it may be shifted along telescoping axis 44. The telescoping arm comprises a bushing 39 fixed within the hollow member and a bar 40 axially slidable, but not twistable, relative to the bushing 39. As shown in FIG. 5, both the bushing 39 and the bar 40 have round guides 43 and flattened portions 45. Some of the flattened portions 45 are oriented in planes parallel to the plane in which the clamping lever 20 pivots. Other of the flattened portions 45 are oriented in planes perpendicular to the plane in which the clamping lever 20 pivots. The engagement of the flattened surfaces on the bushing 39 and the bar 40 prevent the bar 40 from rotating within the bushing 39 about the axis 44.

The transmission of the clamping force in the telescoping arm 38 between the bar 40 and the bushing 39 and between the bushing 39 and the guide part 37 is accomplished on surfaces at 45° relative to the plane in which the clamping lever pivots. This compensates for the lateral clearance between the bushing 39 and the bar 40 and between the bushing 39 and the guide part 37 and cushions the lateral machining forces experienced in processing a casting. The transmission of the forces between the clamping device 18 resp. the bearing part 21 and the column 16 is accomplished at 45° relative to the clamping plane due to the recesses 46 disposed in the bore of the bearing part 21 in direction of the clamping plane and perpendicularly thereto. This also serves to cushion the lateral machining forces developed during processing of a casting.

A clamping peg 41 extends downwardly from the free end of the clamping lever 20. The free end of the clamping peg 41 is preferably formed with a taper at an angle of 90° to provide a friction factor between the workpiece 15 and the peg 41 of 0.45 to 0.48. This permits the adhesive or frictional force required for high machining performance to be achieved with a relatively small clamping force. Since the clamping arrangement of this invention may be employed for the mechanical trimming of raw castings by the removal of chips therefrom, the impressions developed in these workpieces by the clamping peg 41 are not objectionable. Such impressions would also develop as a result of a Brinell hardness test.

In operating the clamping arrangement of the instant invention, the first step is to adjust the clamping device 18 on the column 16 to a level corresponding to the workpiece 15. This is accomplished by operating the holding mechanism 24 into and out of engagement with the annular grooves 25 and by moving the bearing part 21 along the length of the column 16. The clamping device 18 is then moved to a lateral position relative to platform 2 as shown in FIG. 2. After the workpiece 15 is placed onto the supports 14 of the platform 2, the clamping device 18 is rotated manually to a position over the workpiece 15 and the clamping peg 14 is placed upon the workpiece in an area in which no processing is to take place. The point at which the peg 41 contacts the workpiece should be selected so as to be as concentric as possible relative to the supports 14. Since the clamping device 18 includes a telescoping arm 38, the clamping point may lie within an area outside the rotary axis 3 of the platform 2. Once the precise clamping point has been located, the two clamping cylinders 22 are actuated at a high pressure level to clamp the workpiece 15 against the platform 2 with a high clamping force. At this time, the processing of a first peripheral side may take place by the processing tool 47.

In order to process the remaining peripheral sides of the workpiece 15, the platform 2 with the workpiece 15 thereon must be rotated relative to the tool 47. The column 16 remains locally fixed. To permit rotation of the platform 2, the two clamping cylinders 22 are actuated at a low pressure level to produce a clamping force between the peg 41 and the workpiece 15 of such a magnitude that the peg 41 may join in the movement about the rotary axis 3. This permits the telescoping arm 38 to move radially with respect to the axis 17 of column 16 and the clamping lever 20 to rotate about the axis 17. After completion of the rotary movement to a desired position, the clamping lever 20 is again firmly pressed against the workpiece by the operation of the two clamping cylinders 22 at a high pressure level.

For processing the front side of the workpiece 15, the entire clamping arrangement may be rotated about the axis 4 through an angle of 90°. In this position it is also possible to process various surfaces of the workpiece 15 lying in the area of the clamping lever 20 by rotating platform 2 in the manner discussed above to make these areas accessible to the processing tool 47. After the processing has been completed and the platform 2 is located in a horizontal position, the clearing cylinder 23 is acted upon with a low pressure to lift the clamping lever 20 from the workpiece 15. The workpiece 15 may then be removed after the clamping device 18 is rotated about axis 17 to a position in which it will not interfere with the removal of the workpiece 15.

FIGS. 6–8 illustrate an alternative embodiment for the construction of the telescoping arm 38. In this embodiment, the telescoping arm 38 is guided by rolling members 50. The clamping lever 20 includes a guide part 37a which embraces the bearing part 21 in the same manner as disclosed in connection with FIG. 3. The bar 40a is slidably mounted in the rigid hollow member of guide part 37a to permit the bar 40a to be shifted along axis 44 but not twisted about the axis 44. A clamping peg 41 is disposed on the free end of the bar 40a to engage a workpiece. Twisting of the bar 40a about the axis 44 is prevented by a peg 61 which is screwed into the bar 40a. The peg 61 is guided in a groove 62 formed in the guide part 37a. A holding piece 63 which is adjustably attached to the guide part 37a by screws 65 has a recess 64. The peg 61 extends into the recess 64. The recess 64 has plate springs disposed therein so as to be on opposite sides of the peg 61 extending into the recess 64. The plate springs 66 are guided by guide pegs 67 of a guide part 68 on the peg 61. The spring forces created on both sides of the peg 61 by the plate springs 66 resiliently position the bar 40a, and thereby the clamping peg 41, in a starting location in the middle of the extent of its sliding movement.

The rolling members 50 comprise balls 51 disposed at 45° angles relative to the plane in which the clamping lever 20 pivots. Two balls are provided in the telescoping arm on the side thereof adjacent to the peg 41 and above the telescoping axis 44. Two additional balls 51 are provided in the telescoping arm on the side thereof adjacent to the column 16 and below the telescoping axis 44. The balls 51 are mounted in elongated recesses 52 in the bar 40a and are held in the middle of the recesses 52 by springs 53. The recesses 52 have radial bores 54 in which pegs 55 are disposed to support the balls 51.

The bar 40a has a central bore 56 in which a flexible rod 57 is located. The rod 57 acts as a spring. The longitudinal axis 58 of the rod 57 is coextensive with the telescoping axis 44. The pegs 55 are supported on the thinner ends 59 of the flexible rod 57 to resiliently support the balls 51 in a radial direction relative to the telescoping axis 44. The balls 51 may also be resiliently supported in a radial direction relative to the axis 44 by means of plate or spiral springs disposed in the radial bores 54.

The bar 40a is provided with flat portions 45a on its periphery which extend parallel to the telescoping axis 44. Some of the flat portions 45a are located in planes parallel to the plane in which the clamping lever 20 pivots. Other of the portions 45a are located in planes perpendicular to the plane in which the clamping lever 20 pivots. The diameter of the bar 40a is slightly less than the internal diameter of the hollow member of the guide part 37a. When the bar 40a is located concentrically relative to the hollow member of guide part 37a, a uniform gap 60 is provided between the bar 40a and the guide part 37a. The balls 51 extend into the gap 60 to support the bar 40a.

The bar 40a is maintained in a concentric relationship with the hollow member of guide part 37a by the resiliently supported balls 51 even when the clamping cylinders 22 actuate the clamping lever 20 against a workpiece 15 with a low clamping force. Since the rod 57 will not flex or will flex only to a very slight degree when the clamping cylinders 22 are operated at a low pressure level, the telescoping arm may be shifted easily along the axis 44 only against the slight rolling friction of the balls 51, despite the fact that a clamping force is being applied to the clamping lever 20. In this manner, only a slight tilting force is developed on a workpiece 15 when the peg 41 is pressed against it eccentrically relative to the axis 3 during rotation of the platform 2, even if the workpiece 15 is relatively high. This slight tilting force is not sufficient to cause the workpiece to tilt on the platform 2.

When the clamping cylinders 22 are operated at a high pressure level, the rod 57 will flex. This causes the balls 51 to retract within the periphery of the bar 40a so that the periphery of the bar 40a comes into frictional engagement with the internal surface of the hollow member of guide part 37a. The frictional engagement of bar 40a and guide part 37a produces a jamming effect which is sufficiently great to prevent the shifting of the telescoping arm along the axis 44 during processing of the workpiece.

From the above description it is clear that a workpiece held in the clamping arrangement of this invention may be processed on all its peripheral sides and in large areas of its front side in a single clamping of the workpiece without the elements of the clamping arrangement significantly limiting the operational area of the work tool. This permits complete removal of the core and divisional burr ridges and of feeders or remains of chamfer in the case of raw castings in a single clamping without great expenditure. The secure manner in which the workpiece is held within the clamping arrangement of this invention permits the arrangement to withstand the high cutting forces which may incurred during processing of the casting. This enables the casting to be processed profitably.

While certain advantageous embodiments have been chosen to illustrate the invention, it will be understood by those skilled in the art that various changes and modifications can be made therein without departing from the scope of the invention as defined in the appended claims.

What is claimed is:

1. A clamping arrangement for supporting raw castings or other workpieces during processing comprising housing means adapted to be connected to a frame;

a platform rotatably mounted on said housing means about a first vertical axis;

a column secured to said housing means adjacent to, but outside, the periphery of said platform, said column extending along a second vertical axis;

supporting means rotatably mounted on said column about said second vertical axis; and a clamping lever pivotably coupled to said supporting means to permit said lever to move toward said platform to clamp a workpiece therebetween and away from said platform to release a workpiece, said lever including a guiding means and a telescoping arm slidably mounted in said guiding means to permit said telescoping arm to move along a telescoping axis which is disposed radially with respect to said second vertical axis, said telescoping arm having means mounted thereon for engaging the workpiece.

2. A clamping arrangement according to claim 1, wherein said column has a plurality of parallel annular grooves formed therein and spaced along its length, and said supporting means has holding means for releasably and selectively engaging each of said grooves to permit said supporting means to be adjustably mounted at various positions along the length of said column, whereby the distance between said clamping lever and said platform may be varied.

3. A clamping arrangement according to claim 1, further including at least one fluid pressure operated clamping cylinder operably coupled to said clamping lever for actuating same at different pressure levels, whereby said clamping lever may be forced against a workpiece with a relatively high pressure during processing and be forced against a workpiece with a relatively low pressure during rotation of said platform.

4. A clamping arrangement according to claim 3, further including a fluid pressure operated clearing cylinder operably coupled to said clampng lever so as to act counter to said clamping cylinder to force said clamping lever to move away from a workpiece placed on said platform.

5. A clamping arrangement according to claim 1, wherein said telescoping arm has guides which are parallel to said telescoping axis and are disposed between 30° and 60° relative to the plane defined by the pivotable movement of said clamping lever.

6. A clamping arrangement according to claim 5, wherein said telescoping arm guides are round and have at their periphery flattened portions which are parallel to said telescoping axis, some at said flattened portions disposed in planes parellel to the plane defined by the pivotable movement of said clamping lever and some of said flattened portions disposed in planes perpendicular to the plane defined by the pivotable movement of said clamping lever, whereby said telescoping arm does not twist within said guiding means.

7. A clamping arrangement according to claim 5, wherein said guides comprise rolling members and means for resiliently supporting said rolling members in said telescoping arm.

8. A clamping arrangement according to claim 7, wherein said means for resiliently supporting said rolling members extend said rolling members beyond the periphery of said telescoping arm to permit said rolling members to roll against said guiding means during movement of said telescoping arm along said telescoping axis when a low clamping force is applied to said clamping lever and retract said rolling members within the periphery of said telescoping arm to permit the periphery of said telescoping arm to engage frictionally the guiding means when a high clamping force is applied to said clamping lever to lock said telescoping arm in a single position along said telescoping axis.

9. A clamping arrangement according to claim 7 wherein said rolling members are balls which are disposed at a 45° angle relative to the plane defined by the pivotable movement of said clamping lever.

10. A clamping arrangement according to claim 9, wherein two balls are provided in said telescoping arm on the side thereof adjacent to said means for engaging a workpiece and above said telescoping axis, and two balls are provided on said telescoping arm on the side thereof adjacent to said column and below said telescoping axis.

11. A clamping arrangement according to claim 10, wherein said means for resiliently supporting said rolling members comprises a bending rod disposed in said telescoping arm, said rod biases and supports said balls in a radial direction relative to said telescoping axis.

12. A clamping arrangement according to claim 11, wherein said rod is located in said telescoping arm so that the longitudinal axis of said rod is coextensive with said telescoping axis.

13. A clamping arrangement according to claim 1, wherein said means for engaging a workpiece comprises a conical clamping peg.

14. A clamping arrangement according to claim 1, wherein said supporting means comprises a bearing part having two balls upon which said clamping lever is pivoted and tension springs connected at their respective ends to said bearing part and said clamping lever, whereby said bearing part is positively connected to said clamping lever.

15. A clamping arrangement according to claim 14, wherein said bearing part has contact surfaces adjacent to said column and disposed between 30° and 60° relative to the plane defined by the pivotable movement of said clamping lever.

* * * * *